United States Patent [19]

Landriault

[11] Patent Number: 4,537,429
[45] Date of Patent: Aug. 27, 1985

[54] TUBULAR CONNECTION WITH CYLINDRICAL AND TAPERED STEPPED THREADS

[75] Inventor: L. Steven Landriault, Houston, Tex.

[73] Assignee: Hydril Company, Los Angeles, Calif.

[21] Appl. No.: 488,633

[22] Filed: Apr. 26, 1983

[51] Int. Cl.³ ............................................. F16L 25/00
[52] U.S. Cl. ................... 285/334; 285/351; 285/369; 285/417
[58] Field of Search ............. 285/334, 333, 332, 355, 285/351, 390, 369, 417

[56] References Cited

U.S. PATENT DOCUMENTS

| | | | |
|---|---|---|---|
| 1,927,656 | 9/1933 | Eaton et al. | 285/115 |
| 1,932,427 | 10/1933 | Stone | 285/334 |
| 1,973,848 | 9/1934 | Duffy | 285/333 X |
| 2,211,179 | 8/1940 | Stone . | |
| 3,224,799 | 12/1965 | Blose . | |
| 3,489,437 | 1/1970 | Duret | 285/55 |
| 3,989,284 | 11/1976 | Blose . | |
| 4,009,893 | 3/1977 | Shatton et al. | 285/334 X |
| 4,192,533 | 3/1980 | Blose . | |
| 4,244,607 | 1/1981 | Blose . | |
| 4,253,687 | 3/1981 | Maples . | |
| 4,373,754 | 2/1983 | Bollfrass et al. | 285/334 |

OTHER PUBLICATIONS

ASME Publication, 75-Pet-34, Jun. 19, 1975.

Primary Examiner—Richard J. Scanlan, Jr.
Attorney, Agent, or Firm—Dodge, Bush & Moseley

[57] ABSTRACT

A tubular joint or connector of box and pin members is disclosed having first threads provided on a taper with respect to the axis of the joint and second threads which are cylindrical and axially separated from the first threads. The first and second threads are radially separated by a step region. Two metal-to-metal seals of complementary engaging sealing surfaces are provided, one adjacent the end of the pin member, the other axially disposed between the two threads. Reverse angle torque shoulders at the end of the pin member and the interior termination of the box member and hooked threads further characterize the joint and box and pin members.

12 Claims, 3 Drawing Figures

TUBULAR CONNECTION WITH CYLINDRICAL AND TAPERED STEPPED THREADS

BACKGROUND OF THE INVENTION

1. Field of the Invention

The invention relates generally to a tubular connection for tubular members used in the oilfield. Specifically, the invention relates to a relatively thin walled connection for tubular members under conditions of high tension and high pressure yet fabricated of high strength relatively thin wall material used as production tubing or casing in deep severe service oil or gas wells.

2. Description of the Prior Art

Downhole conditions in wells reaching depths over fifteen thousand feet include pressures from fifteen thousand (15,000) to twenty-five thousand (25,000) psi and temperatures approaching five hundred (500) degrees fahrenheit. Downhole conditions are often characterized as severe when sweet gas $C_O2$ or sour gas $H_2S$ is encountered. In order to withstand deep well and severe service conditions, production tubing and casing connectors are often fabricated from relatively thin walled high alloy steel that is not upset or cold formed. Such steel has very high strength and thus is not required to be as thick as low strength steels. Even where severe service conditions are not expected, there are instances where near maximum of tensile strength of the connection is required of non-upset or non-cold formed tubular members.

Thus, there has developed a need in the tubular connection industry for a connection design applicable for non-upset or non-cold formed tubular members adapted for service under deep and/or severe conditions or other conditions.

Prior art connection designs provided on ends of tubular members not having upsets or not processed by cold forming have been provided on a single thread geometry having a positive load flank thread. Such prior art design leads to radial crest to root thread interference causing significant assembly stresses and jump-out failures.

Straight or cylindrical two step thread designs are known in the prior art, but maximum tensile strength ratings of such designs may not be achievable especially where service of the tubing members is expected in extremely deep wells.

It is therefore an object of this invention to provide a tubular connection and pin and box members for that connection especially adapted for high-strength steel tubular members which are not upset or cold formed, and where the connection overcomes the disadvantages of the prior art connections.

It is a further object of the invention to provide a connection design which achieves a higher tensile rating than could be obtained with non-tapered two-stepped threads, that is where the stepped threads are both cylindrical threads.

It is a further object of this invention to provide a tubular connection which reduces the susceptibility of the connection to stress corrosion cracking in a severe service environment.

It is still another object of the invention to provide a connection which inhibits excessive compression forces from radially collapsing the end of the pin member.

It is another object of the invention to provide a connection which creates axial compression of the internal surface of the pin thereby reducing the susceptibility of the connection to stress corrosion cracking in a severe service environment.

It is another object of the invention to provide sealing surfaces which increase the seal radial load distribution over that provided by prior art connections thereby reducing the tendency for galling by reducing peak seal load.

It is another object of the invention to provide a connection which combats the tendency for jump-out by locking the pin and box together thereby reducing collapse of the pin and expansion of the box.

SUMMARY OF THE INVENTION

The above mentioned objects and other advantages and features of the invention are provided in a tubular connection of pin and box members having first and second pairs of interengaged threads on the respective members. The first pair of threads is axially spaced from the second pair of threads. The first pair of threads is provided on a taper angle with respect to the axis of the connection of the tubular members. The second pair of threads is provided on a straight or cylindrical profile with respect to the axis of the connection of the tubular members. The first pair of threads is radially stepped with respect to the second pair of threads.

The connection includes a first pair of engaged conical sealing surfaces on the pin and box members disposed adjacent the end of the pin member. A second pair of engaged conical sealing surfaces is provided on the pin and box members and disposed axially between the first and second pair of threads. Engaged reversed angle torque shoulders are provided where the torque shoulder on the pin member is disposed on the end of the pin member and the torque shoulder on the box member is disposed on the interior end of the box member. The threads of the two pairs of interengaged threads are hooked threads having negative angle load flanks.

According to the invention, the hooked threads develop hoop compression when the joint is subjected to tension, thereby locking the pin and box together and reducing the tendency for collapse of the pin and expansion of the box. When the joint is subjected to bending, the hooked threads develop hoop compression on the side of the joint in tension as a result of the bending, while the engaged reverse angle torque shoulders absorb the bending load on the other side of the joint put in compression as a result of the bending.

The engaged reverse angle torque shoulders are adapted to create a substantially recess free bore in the tubular line in order to enhance fluid flow through the pipe, to serve as a positive stop and locking device for assembly torque, to inhibit excessive hoop compression forces from collapsing the end of the pin, to fix the axial relation of the end of the pin to the box, to create axial compression over the internal surface to reduce the susceptibility of the joint to stress corrosion cracking in a severe service environment and to cause the pair of engaged conical surfaces disposed adjacent the end of the pin to expand radially.

The first and second pairs of conical sealing surfaces are preferably provided at steeper angles than the taper angle of the first pair of threads. Although the precise angles of the sealing surfaces and taper angle of the first pair of threads are dependent on the wall thickness of the tubular members to be connected, the first and second pair of conical sealing surfaces are preferably provided at an angle of approximately four to fourteen degrees with respect to the axis of the joint while the taper angle of the first pair of threads is preferably provided approximately two to eight degrees with respect to the axis of the joint.

BRIEF DESCRIPTION OF THE DRAWINGS

The foregoing summary of the invention and other objects and advantages of the invention will be described in more detail below taken in conjunction with the accompanying drawings of which.

DESCRIPTION OF THE INVENTION

Figure 1:
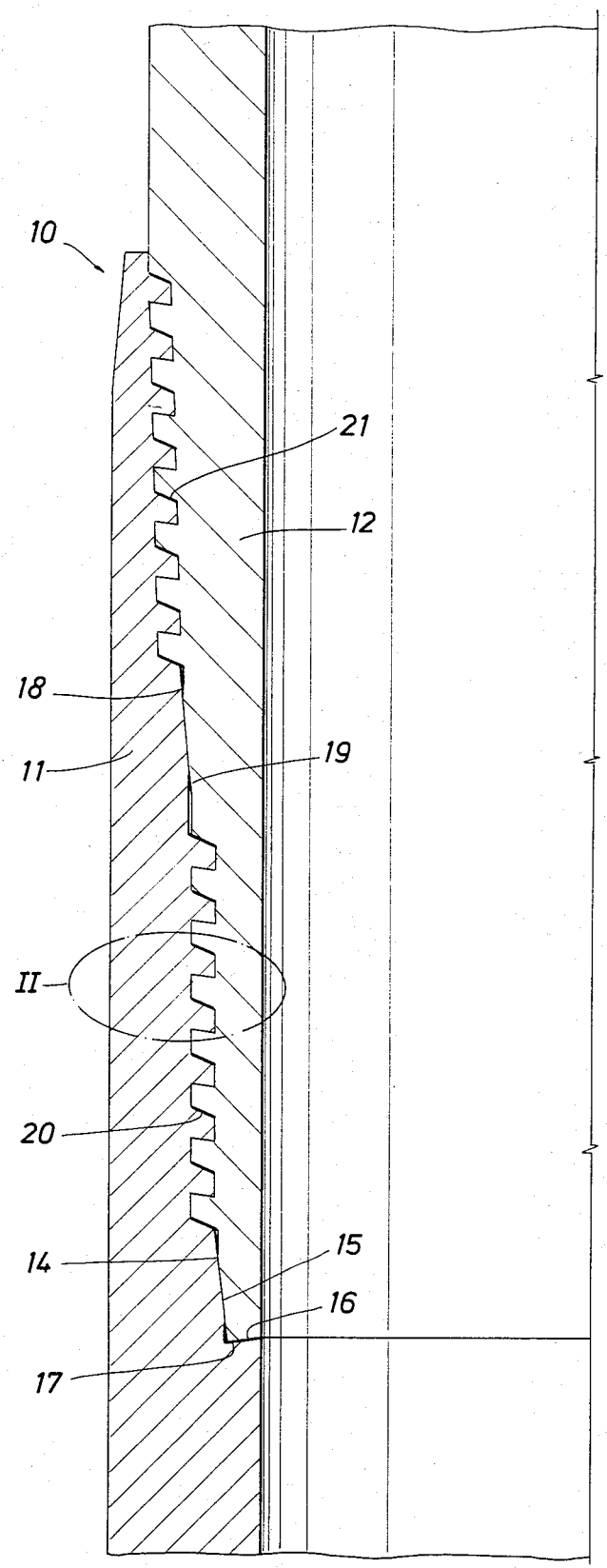
FIG. 1 is a cross-section through the tubular connection showing pin and box members interengaged.

FIG. 1 illustrates the tubular connection 10 according to the invention in which a pin member 12 is threadedly interengaged with a box member 11. The pin member 12 and box member 11 have first and second threaded surfaces 21 and 20. Thread surface 21 is provided at a taper angle with respect to the axis of the joint. Thread surface 20 is provided parallel with the axis of the joint, e.g., the threads on surface 21 are cylindrical threads.

The tapered threads on surfaces 21 allow the threaded connection to run out to the tubular member outside diameter, thereby achieving a higher tensile rating than could be obtained if threaded surface 21 were a cylindrical thread separated by a step between cylindrical threaded surface 20.

Metal-to-metal frustro-conical sealing surfaces 18 and 19 are provided axially between first and second threaded surfaces 21 and 20. Metal-to-metal frustro-conical sealing surfaces 14 and 15 are provided adjacent the end of the pin and the interior end of the box. Complementary reverse angle torque shoulders 16 and 17 are provided on the end of the pin 12 and on the interior end of the box 11.

Figure 2:
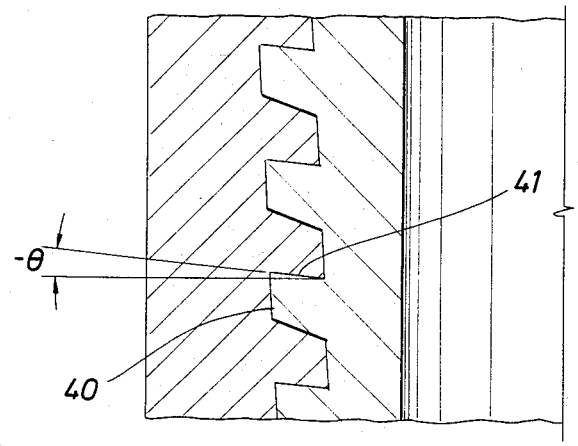
FIG. 2 is an enlarged illustration of a threaded portion of the connection illustrating hooked threads.

According to the invention, the threaded surfaces 21 and 20 are provided in the form of hooked threads. An example thread is illustrated in FIG. 2 by reference number 40 showing that the load flank 41 is provided at a negative angle ($-\theta$) with respect to a radial plane through the thread.

According to the invention, the threaded connection including the two-step profile, facilitates deep stabbing and ease of make-up between the pin member 12 and the box member 11. The hooked threads of cylindrical threaded surfaces 20 are relatively less susceptible to thread hang-up on threads of tapered cylindrical threaded surfaces 21 because of the tapering of threaded surfaces 21. That is, upon disengagement of the pin 12 from the box 11, the threaded pin of surface 20 is relatively less likely to hang up on the box threaded surface 21 because of the increasing inside diameter of the box threads of the tapered surface 21.

Providing the taper angle of threaded surface 21 in combination with the cylindrical stepped threads of threaded surfaces 20 enables the entire connection to have maximum thread and critical section areas allowing uniform reduction in section flexibility around the sealing regions and reduction of the relative step height between the stepped thread regions. The taper of the threads of threaded surface 21 also allows for adjustment to tolerance variations in pipe outside diameter and inside diameter provided by tubular fabricators without weakening the connection.

The torque shoulders 16 and 17 are completely internal to the connection and create an essentially recess free bore to enhance fluid flow. The torque shoulders serve as a positive stop and locking means as the pin and box members are assembled under torquing conditions. The reverse angle of the torque shoulder serves to inhibit excessive hoop compressive forces from collapsing the end of the pin 12. The reverse shoulder angle also fixes the relation between the end of the pin and the interior end of the box. The internal torque shoulder also creates axial compression along an axial region of the internal surface of the pin thereby reducing the susceptibility of the connection to stress corrosion cracking in a severe service environment. The compressive force resulting from the reverse angle torque shoulder also tends to cause the seal region defined by sealing surfaces 14 and 15 to expand radially due to the end load.

The metal-to-metal seals defined by sealing surfaces 14 and 15 and 18 and 19 are provided respectively as an internal seal and as a backup seal for internal pressure and a primary external seal. The sealing angles of sealing surfaces 14 and 15 and 18 and 19 are more shallow than typical cylindrical two-step metal-to-metal seals. The shallowness of the angles of the sealing surfaces increases the sealing surface contact area thereby increasing the seal radial load distribution and reducing the tendency for galling by reducing the peak sealing load. The sealing angles are provided in a range of four to fourteen degrees with respect to the axis of the joint, the particular angle of any connection depending on the wall thickness of the connection.

The hooked threads provided in the tubular connection 10 inhibit the tendency for thread jump-out. The negative angle load flank threads, when subjected to tension between the pin 12 and the box 11, develop a hoop compression component. This hoop compression locks the pin and box together thereby reducing collapse of the pin and expansion of the box. A similar reaction occurs when the tubular connection is subjected to bending wherein on the tension side of the connection, the hooked threads develop a hoop compression component locking that side of the pin and box together, while the torque shoulder absorbs the load on the compression side of the bending connection.

Figure 3:
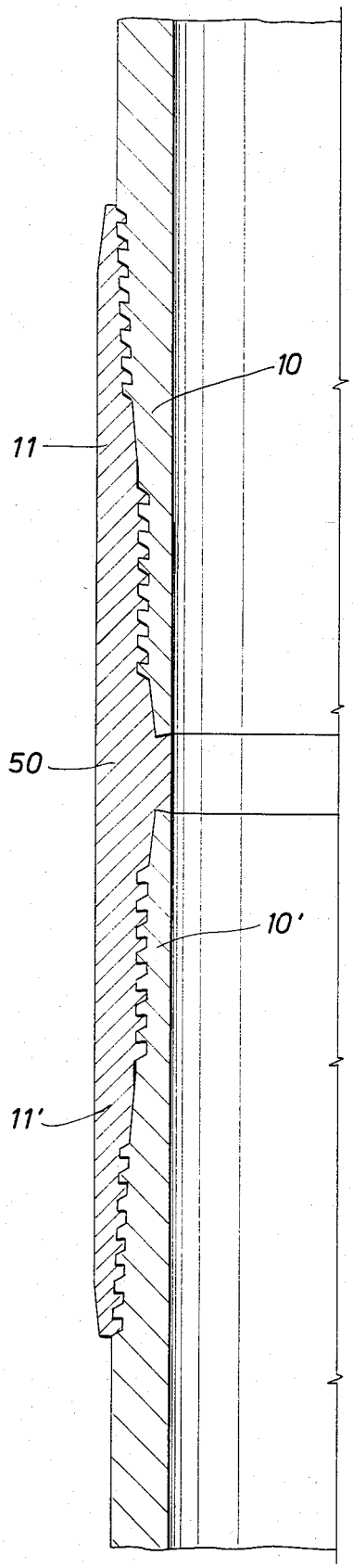
FIG. 3 is an illustration of the coupling connecting pin members of two tubular members.

FIG. 3 illustrates a connector serving to connect the ends of two tubular members together. Two box threaded surfaces 11 and 11' serve to interengage with pin threaded surfaces 10 and 11 of the two tubular members. The connection between box 11' and pin 10' is the mirror image of that between box 11 and pin 10.

Various modifications and alterations in the described tubular connection will be apparent to those skilled in the art from the foregoing description which does not depart from the spirit of the invention. The foregoing disclosure and description of the invention are illustrative and explanatory thereof and details of the illustrative embodiment may be made without departing from the spirit of the invention.

What is claimed is:

1. A tubular connection of pin and box members defining an axis comprising, first and second pairs of interengaged threads on the respective members, the first pair of threads being axially spaced from the second pair of threads, the first pair of threads provided on a taper angle with respect to the axis, the second pair of threads being cylindrical threads, the first pair of threads being radially stepped with respect to the second pair of threads, a first pair of engaged sealing surfaces on the pin and box members disposed adjacent the end of the pin member, a second pair of engaged sealing surfaces on the pin and box members disposed axially between the first and second pairs of threads, said second pair of sealing surfaces provided at a steeper angle than the taper angle of the first pair of the threads, engaged reverse angle torque shoulders, the torque shoulder on the pin member disposed on the end of the pin member, the torque shoulder on the box member disposed on the interior end of the box member, and wherein said threads are hooked threads having negative angle load flanks.

2. The joint of claim 1 wherein said hooked threads develop hoop compression when the joint is subjected to tension thereby locking the pin and box together reducing the tendency for collapse of the pin and expansion of the box.

3. The joint of claim 1 wherein when said joint is subjected to bending, the hooked threads develop hoop compression on the side of the joint in tension as a result of the bending while the engaged reverse angle torque shoulders absorb the bending load on the other side of the joint put in compression as a result of the bending.

4. The joint of claim 1 wherein the engaged reverse angle torque shoulders are adapted to create a recess free bore to enhance fluid flow through the pipe, to serve as a positive stop and locking device for assembly torque, to inhibit excessive hoop compressive forces from collapsing the end of the pin, to fix the axial relation of the end of the pin to the box, and to create axial compression over the internal surface to reduce the susceptibility of the joint to stress corrosion cracking in a severe service environment and to cause the first pair of engaged conical sealing surfaces to expand radially.

5. The joint of claim 1 wherein the first and second pairs of sealing surfaces are frustro-conical surfaces provided from a range of angles of approximately four to fourteen degrees with respect to the axis of the joint.

6. The joint of claim 1 wherein the taper angle of the first pair of threads are provided on a taper angle of a range of approximately two to eight degrees with respect to the axis of the joint.

7. A pin member for a tubular member and adapted for coaxial connection to a box member, the pin member comprising, first and second axially spaced threads, the first threads provided at a taper angle with respect to the axis of the pin, the second threads being cylindrical threads, the first thread being radially stepped with respect to the second thread, a first frustro-conical sealing surface on the pin member disposed adjacent the end of the pin member, a second frustro-conical sealing surface on the pin member disposed axially between the first and second threads, said sealing surface provided at a steeper angle than the taper angle of the first threads, a reverse angle torque shoulder disposed on the end of the pin member, and wherein the first and second threads are hooked threads having negative angle load flanks.

8. The pin member of claim 7 wherein the first and second frustro-conical sealing surfaces are provided from a range of angles of approximately four to fourteen degrees with respect to the axis of the pin.

9. The pin member of claim 7 wherein the first threads are provided on a taper angle from a range of angles of approximately two to eight degrees with respect to the axis of the pin.

10. A box member adapted for coaxial connection to a pin member disposed on the end of a tubular member, the box member comprising, first and second axially spaced threads, the first threads provided on a taper angle with respect to the axis of the box, the second threads being cylindrical threads, the first threads being radially stepped with respect to the second threads, a first frustro-conical sealing surface disposed adjacent the interior end of the box member, a second frustro-conical sealing surface about the interior of a box member disposed axially between the first and second threads, said second sealing surface provided at a steeper angle than the taper angle of the first threads, a reverse angle torque shoulder disposed on the interior end of the box member, and wherein the first and second threads are hooked threads having negative angle load flanks.

11. The box member of claim 10 wherein the first and second sealing surfaces are frustro-conical surfaces provided from a range of angles of approximately four to fourteen degrees with respect to the axis of the box.

12. The box member of claim 10 wherein the first threads are provided on a taper angle from a range of angles of approximately two to eight degrees with respect to the axis of the box.

* * * * *